(12) United States Patent
Siah et al.

(10) Patent No.: US 7,565,034 B2
(45) Date of Patent: Jul. 21, 2009

(54) DETERMINATION OF A NAVIGATION WINDOW IN AN OPTICAL NAVIGATION SYSTEM

(75) Inventors: Tiong Heng Siah, Johor (MY); Heng Yew Kong, Jin Kakwa (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 739 days.

(21) Appl. No.: 10/870,192

(22) Filed: Jun. 17, 2004

(65) Prior Publication Data

US 2005/0281466 A1  Dec. 22, 2005

(51) Int. Cl.
G06K 9/54 (2006.01)
(52) U.S. Cl. .................. 382/305; 250/208.1; 250/557; 345/156; 348/148; 382/104
(58) Field of Classification Search .......... 382/305, 382/144–151, 168–172, 181
See application file for complete search history.

(56) References Cited

U.S. PATENT DOCUMENTS

| | | | | |
|---|---|---|---|---|
| 2,645,158 A * | 7/1953 | Bertell et al. | ............ | 359/605 |
| 4,162,481 A * | 7/1979 | DuVall | ............ | 382/272 |
| 4,326,258 A * | 4/1982 | de la Guardia | ............ | 382/137 |
| 4,398,256 A * | 8/1983 | Nussmeier et al. | ............ | 382/288 |
| 4,441,205 A * | 4/1984 | Berkin et al. | ............ | 382/151 |
| 4,811,410 A * | 3/1989 | Amir et al. | ............ | 382/147 |
| 4,853,968 A * | 8/1989 | Berkin | ............ | 382/151 |
| 4,926,452 A * | 5/1990 | Baker et al. | ............ | 378/22 |
| 5,392,359 A * | 2/1995 | Futamura et al. | ............ | 382/141 |
| 5,443,152 A * | 8/1995 | Davis | ............ | 206/5.1 |
| 5,555,312 A * | 9/1996 | Shima et al. | ............ | 382/104 |
| 5,578,813 A | 11/1996 | Allen et al. | | |
| 5,644,139 A | 7/1997 | Allen et al. | | |
| 5,831,254 A * | 11/1998 | Karpen et al. | ............ | 235/454 |
| 5,886,704 A * | 3/1999 | Kang et al. | ............ | 345/426 |
| 5,892,855 A * | 4/1999 | Kakinami et al. | ............ | 382/291 |
| 6,385,338 B1 * | 5/2002 | Saito et al. | ............ | 382/173 |
| 6,473,522 B1 * | 10/2002 | Lienhart et al. | ............ | 382/168 |
| 6,603,111 B2 | 8/2003 | Dietz et al. | | |
| 6,717,518 B1 * | 4/2004 | Pirim et al. | ............ | 340/576 |
| 6,906,467 B2 * | 6/2005 | Stam et al. | ............ | 315/82 |
| 7,065,261 B1 * | 6/2006 | Horie | ............ | 382/289 |
| 7,142,703 B2 * | 11/2006 | Kaufman et al. | ............ | 382/131 |
| 7,236,623 B2 * | 6/2007 | Chapoulaud et al. | ............ | 382/133 |
| 2002/0001418 A1 * | 1/2002 | Fahraeus et al. | ............ | 382/311 |
| 2002/0060522 A1 * | 5/2002 | Stam et al. | ............ | 315/82 |
| 2002/0179713 A1 * | 12/2002 | Pettinelli et al. | ............ | 235/454 |
| 2003/0016851 A1 * | 1/2003 | Kaufman et al. | ............ | 382/131 |
| 2004/0179099 A1 * | 9/2004 | Bos et al. | ............ | 348/148 |
| 2005/0260583 A1 * | 11/2005 | Jackway et al. | ............ | 435/6 |
| 2006/0093193 A1 * | 5/2006 | Viswanathan | ............ | 382/128 |
| 2007/0230784 A1 * | 10/2007 | Nakamura | ............ | 382/174 |

* cited by examiner

Primary Examiner—Samir A. Ahmed
Assistant Examiner—Tsung-Yin Tsai (57) ABSTRACT

A technique for reducing navigation errors that are caused by uneven illumination involves using only the portion of the image data that is properly illuminated in the correlation process. The portion of the image data that is used for optical navigation is established by summing the image data on a per-slice basis, comparing the per-slice sums to a pre-established intensity threshold, and defining boundaries of the navigation window in response to the comparison. Boundaries are set at the points where the per-slice sums equal the pre-established intensity threshold.

19 Claims, 10 Drawing Sheets

DETERMINATION OF A NAVIGATION WINDOW IN AN OPTICAL NAVIGATION SYSTEM

BACKGROUND OF THE INVENTION

Optical navigation upon arbitrary surfaces produces motion signals indicative of relative movement along the directions of coordinate axes, and is becoming increasingly prevalent. It is used, for instance, in optical computer mice and fingertip tracking devices to replace conventional mice and trackballs for the position control of screen pointers in windowed user interfaces for computer systems. It has many advantages, among which are the lack of moving parts that accumulate dirt and suffer the mechanical wear and tear of use. Another advantage of an optical mouse is that it does not need a mouse pad, since it is generally capable of navigating upon arbitrary surfaces, so long as they are not optically featureless.

Optical navigation operates by tracking the relative displacement between two images. To determine the relative displacement between two images, a surface is illuminated and a two-dimensional view of a portion of the surface is focused upon an array of photodetectors. The output of the photodetectors is digitized and stored as a reference image in a corresponding array of memory. A brief time later a sample image is captured using the same process. If there has been no motion between the image capture events, then the sample image and the reference image are identical (or very nearly so). That is, the image features of the reference image data and the sample image data appear to match up. If, on the other hand, there has been some motion between the image capture events, then the features of the sample image will appear to have shifted within its borders, and the digitized arrays will no longer match. The matching process that is used in optical navigation to align similar features of two images is termed "correlation" and typically involves a two-dimensional cross-correlation between the reference image data and the sample image data. A two-dimensional cross-correlation between the reference image data and the sample image data compares intensity values of the image data on a pixel-by-pixel basis to determine relative displacement between the two sets of image data.

The image features that are relied upon to determine relative displacement are produced by illuminating a surface. If the illumination of the surface is not evenly distributed or the illumination source is not properly aligned, tracking errors may result. In particular, a misaligned illumination source can cause boarders of the image data to appear dark and therefore lack sufficient contrast to support the feature matching process. Further, if the illumination drops off suddenly at some point within the image data, the contrast in brightness may appear as an image feature (e.g., an edge), which can severely degrade the tracking efficiency. The false detection of an edge can be especially detrimental in image tracking algorithms that rely on edge detection.

In view of this, what is needed is a technique for optical navigation that addresses navigation errors that are caused by poor illumination.

SUMMARY OF THE INVENTION

A technique for reducing navigation errors that are caused by uneven illumination involves using only the portion of the image data that is properly illuminated in the correlation process. The portion of the image data that is used for optical navigation, referred to herein as the "navigation window" is established by summing the image data on a per-slice basis, comparing the per-slice sums to a pre-established intensity threshold, and defining boundaries of the navigation window in response to the comparison. Boundaries are set at the points where the per-slice sums equal the pre-established intensity threshold. Using this technique, the correlation process is responsive to actual illumination conditions such that the portions of the image data that are not properly illuminated are not used in the tracking process. Accordingly, portions of the image data that are most likely to cause navigation errors are "trimmed" from the set of image data that is used in the correlation process.

Other aspects and advantages of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar element.

DETAILED DESCRIPTION

Figure 1:
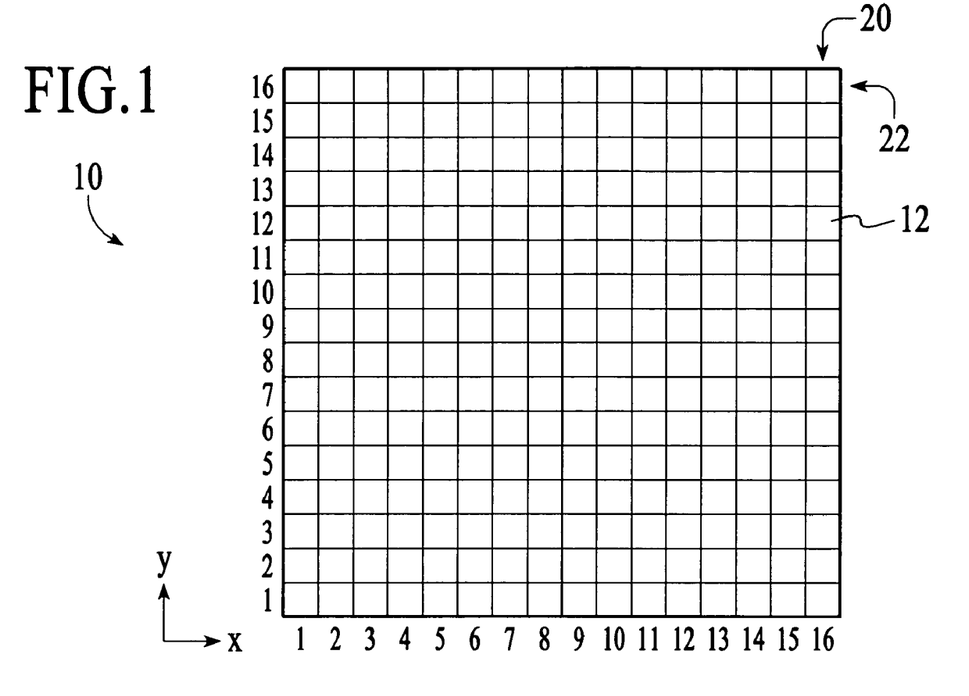
FIG. 1 depicts an image sensor that is formed by an array of photodetectors.

FIG. 1 depicts an image sensor 10 that is formed by an array of photodetectors 12, where each of the individual photodetectors is often referred to as a "pixel." The photodetector array is formed in columns 20 and rows 22 of photodetectors. For description purposes, the columns are parallel to the y-axis and the rows are parallel to the x-axis as indicated in FIG. 1. The photodetector array of FIG. 1 includes a 16×16 array of photodetectors, however, it should be noted that this is for example purposes only. Actual photodetector arrays used in optical navigations systems may range, for example, from 20×20 to 30×30 arrays although other array sizes are possible. As is known in the field, images obtained by the photodetector array are stored as digital image data. In optical navigation applications, the image data is often stored in memory arrays that correspond to the photodetector array.

Figure 2:
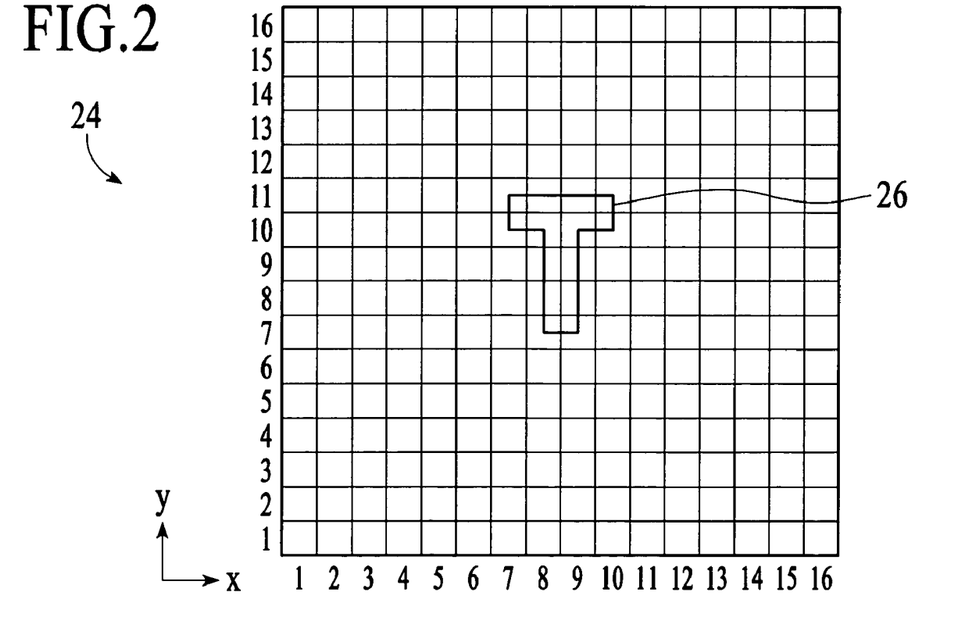
FIG. 2 depicts a set of reference image data that is obtained with the image sensor of FIG. 1 relative to the image sensor's photodetector array.

The basic concept of optical navigation is described with reference to FIGS. 2-4. FIG. 2 depicts a first set of image data 24 that is obtained with the image sensor of FIG. 1 relative to the image sensor's photodetector array. For description purposes, the image data includes a T-shaped image feature 26. Although a T-shaped image feature is depicted for description purposes, the image data could include any combination of random or non-random image features. Throughout the description, the first set of image data is referred to as the "reference image data." In this example, the reference image data is obtained at some time, $t_1$.

At some later time, $t_2$, a second set of image data is obtained by the image sensor. Throughout the description, the second set of image data is referred to as the "sample image data." FIG. 3 depicts sample image data 28 that is obtained with the image sensor of FIG. 1 relative to the image sensor's pixel array. As depicted in FIG. 3, the T-shaped image feature 26 has moved relative to the photodetector array in comparison to the T-shaped image feature in FIG. 2. The movement of the T-shaped image feature is caused by movement that occurs between the image sensor and the imaged surface between image capture events. The relative movement between the image sensor and the imaged surface can be caused by movement of the image sensor relative to a stationary imaged surface, movement of an imaged surface relative to the stationary image sensor, or by movement of both the image sensor and the imaged surface. In an embodiment, image data is captured by the image sensor at a rate of 1,500 images per second.

Cross-correlation is used to determine the relative displacement between the reference image data 24 and the sample image data 26. The cross-correlation process tries to find the best match between the reference image data and the sample image data to determine relative displacement in the x and y directions. The best match is found by matching image features in the two sets of image data. In one example, cross-correlation of digital image data involves "moving" the reference image data to different positions relative to the sample image data and calculating a cross-correlation coefficient at each different position. The location with the highest cross-correlation coefficient indicates the closest correspondence between the reference and sample image data. The reference image data is periodically changed to account for the displacement.

Figure 4:
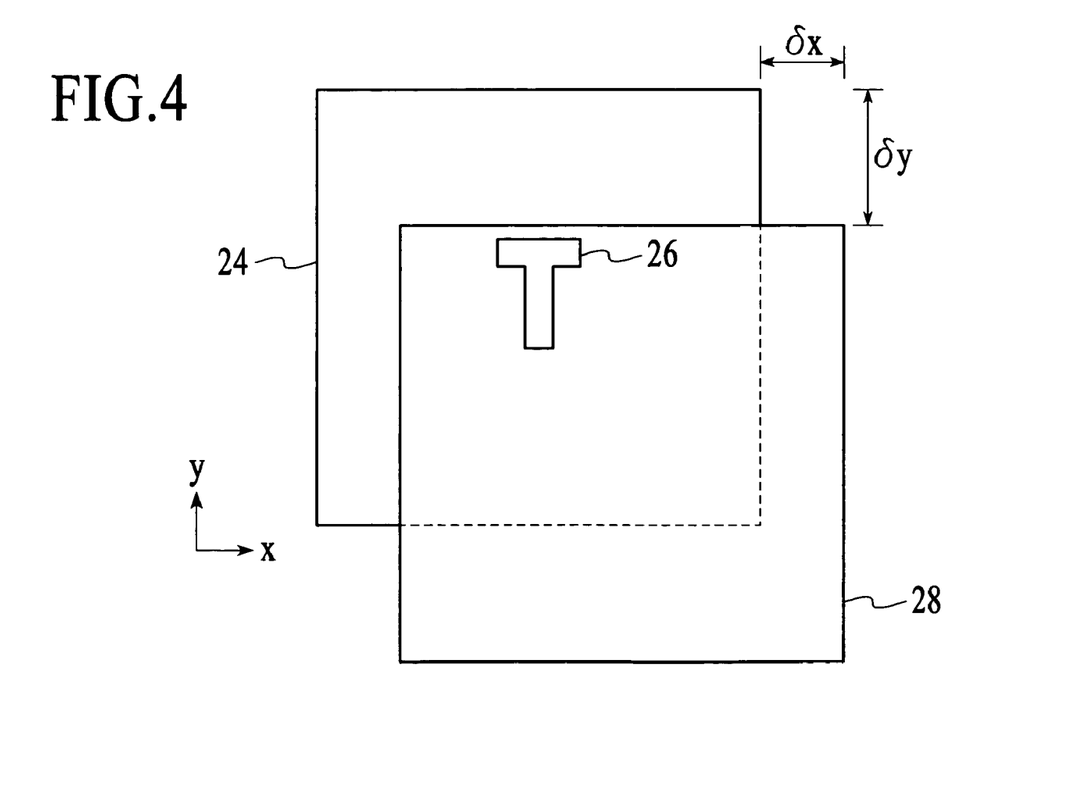
FIG. 4 depicts the reference and sample image data from FIGS. 2 and 3 aligned such that the T-shaped image features of the two sets of image data match.

FIG. 4 depicts the reference and sample image data 24 and 28 aligned such that the T-shaped image feature 26 of the two sets of image data match. When the image features of the two sets of image data match, the relative displacement between the reference image data and the sample image data is evident as depicted in FIG. 4 and can be easily calculated. The relative displacement between the reference image data and the sample image data can be characterized in terms of displacement in the y-direction ($\delta y$) and displacement in the x-direction ($\delta x$).

Because determining the relative displacement between image data relies on a correlation process that essentially involves matching image features, it is important that image data includes discernable image features. The quality of the features captured in the image data degrades when the illumination intensity of the detected features is poor. That is, if the imaged surface is not adequately illuminated with a light source that is aligned to reflect light onto the image sensor, image features will not contain enough contrast to enable reliable image tracking. Although steps are taken to provide the proper illumination, the illumination is not always perfect.

In accordance with the invention, navigation errors that are caused by uneven illumination are reduced by using only the portion of the image data that is properly illuminated in the correlation process. The portion of the image data that is used for optical navigation, referred to herein as the "navigation window" is established by summing the image data on a per-slice basis, comparing the per-slice sums to a pre-established intensity threshold, and defining boundaries of the navigation window in response to the comparison. In particular, boundaries are set at the points where the per-slice sums equal the pre-established intensity threshold. Using this technique, the correlation process is responsive to actual illumination conditions such that the portions of the image data that are not properly illuminated are not used in the tracking process. Accordingly, portions of the image data that are most likely to cause navigation errors are "trimmed" from the set of image data that is used in the correlation process.

As stated above, defining the boundaries of the navigation window involves summing the image data on a per-slice basis. As used herein, the term "per-slice basis" refers to a group of photodetectors and their associated output signals, which is defined by a linear path of photodetectors that runs from opposite edges of a photodetector array. Typically, a slice of photodetectors will be either an entire column of photodetectors or an entire row of photodetectors although this is not a requirement. For description purposes, the optical navigation technique is described in terms of photodetector columns, per-column sums, photodetector rows, and per-row sums.

Figure 5:
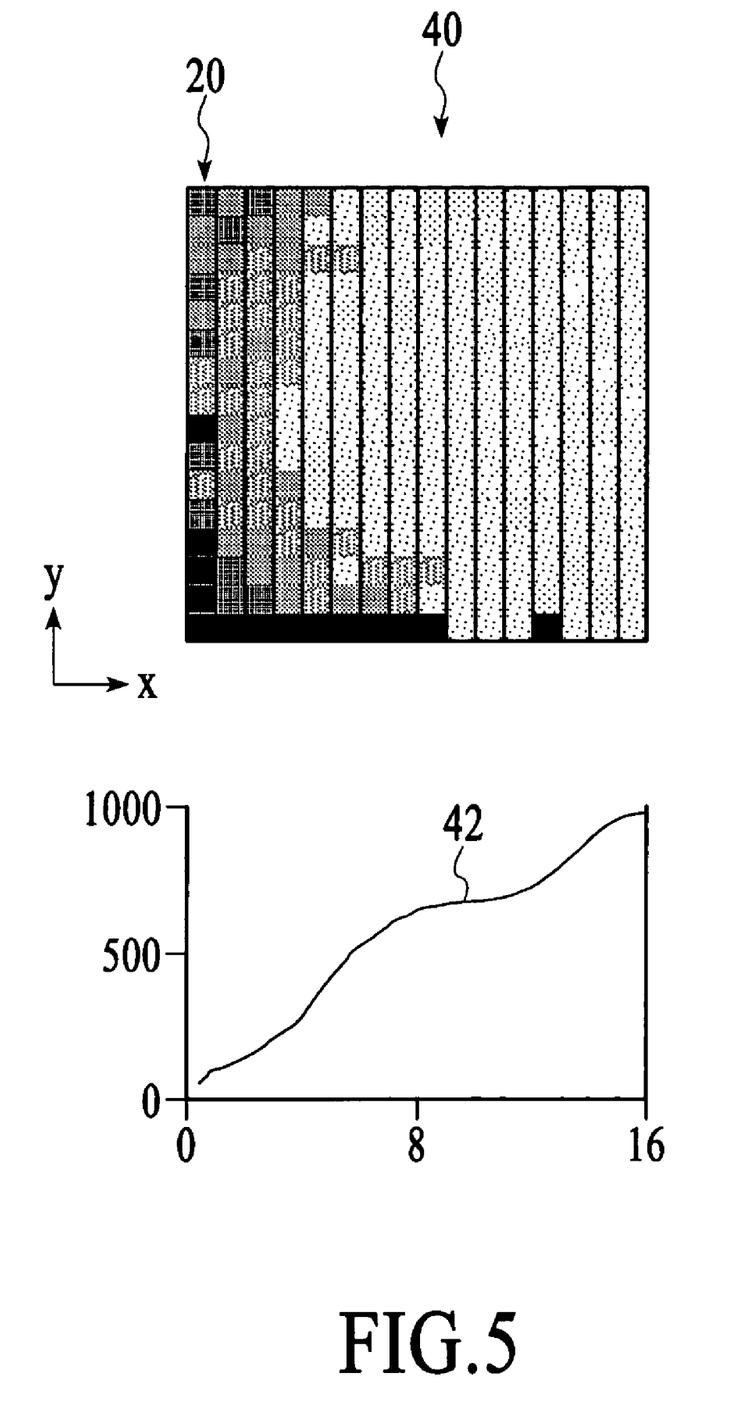
FIG. 5 depicts image data that is divided into columns relative to a graph of the per-column sums of the intensity values of the image data, where the columns correspond to the columns of photodetectors in the photodetector array.

FIG. 5 depicts image data 40 that is divided into columns 20 relative to a graph of the per-column sums of the intensity values 42 of the image data, where the columns correspond to the columns of photodetectors in the photodetector array. The image data can be any image data that is obtained by the photodetector array. In the embodiment of FIG. 5, the image data is obtained from an imaged surface that includes random features. The horizontal lines that represent the individual pixels of the photodetector array and the corresponding image data are not shown in FIG. 5 to highlight the per-column summing operation.

Figure 6:
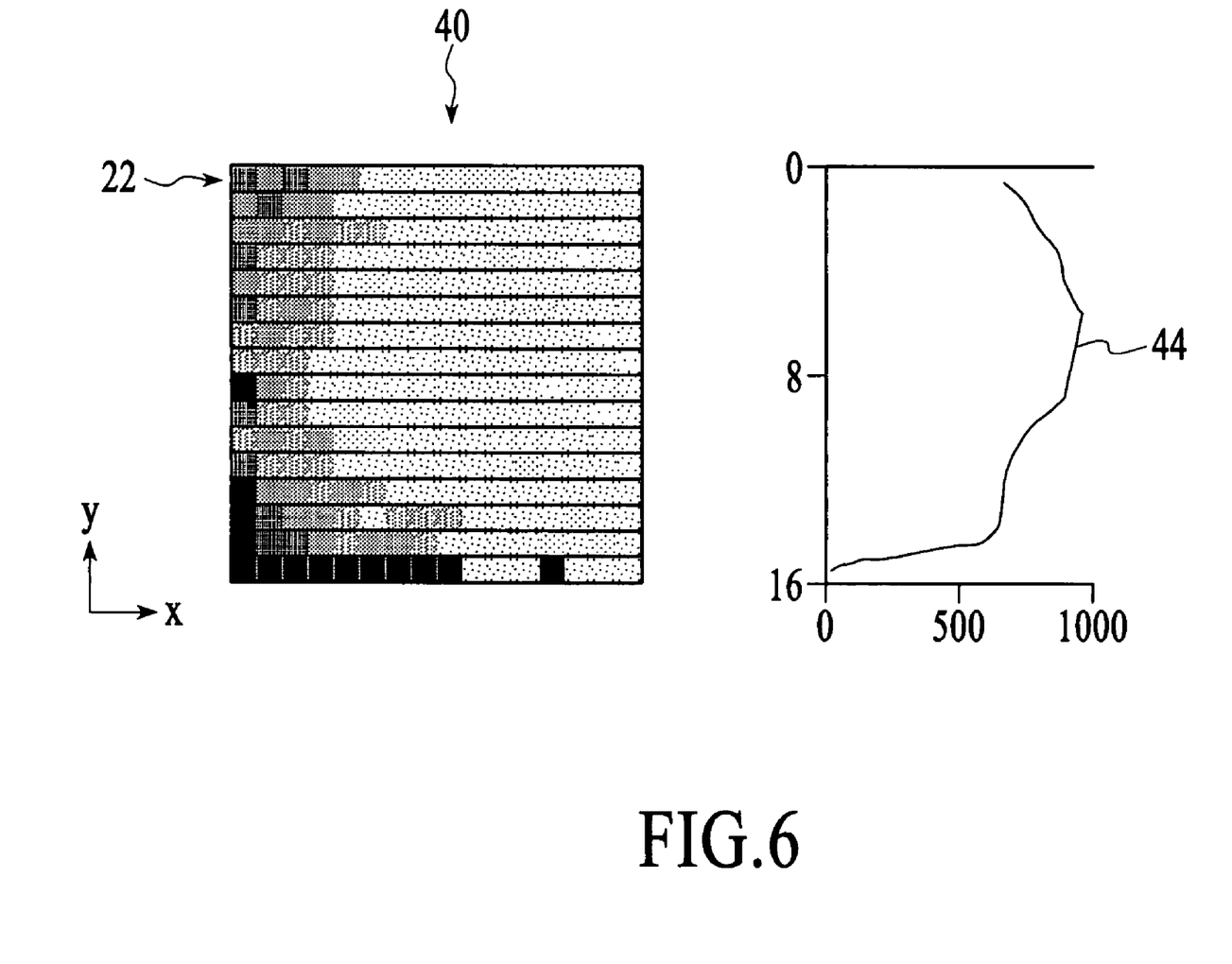
FIG. 6 depicts image data that is divided into rows relative to a graph of the per-row sums of the intensity values of the image data, where the rows correspond to the rows of photodetectors in the photodetector array.

In addition to per-column summing, the same image data is summed on a per-row basis. FIG. 6 depicts the image data 40 divided into rows 22 relative to a graph of the per-row sums of the intensity values 44 of the image data, where the rows correspond to the rows of photodetectors in the photodetector array. The vertical lines that represent the individual pixels of the photodetector array and the corresponding image data are not shown in FIG. 6 to highlight the per-row summing operation.

To establish boundaries for a navigation window that has proper illumination, an illumination threshold is established.

According to the invention, an illumination threshold is established that represents the minimum illumination that is acceptable within the navigation window. In an embodiment, the threshold is defined in terms of a minimum intensity value sum for an entire column or row of image data. That is, the threshold represents the minimum intensity value that should be maintained on a per-column or per-row basis for the sum total of intensity values over an entire column or row of image data. The threshold can be the same for the columns and the rows or it can be specific to the columns and the rows. In an embodiment, the boundaries of the navigation window are established at the points where an intensity sum equals the corresponding threshold. In particular, each of the summed values is compared to the respective column or row threshold and the column and row boundaries are set at the point where the intensity sums equal the respective thresholds. Using this technique, the portions of the image data having intensity value sums that are below the respective thresholds are trimmed from the image data and are not used for image tracking.

Figure 7:
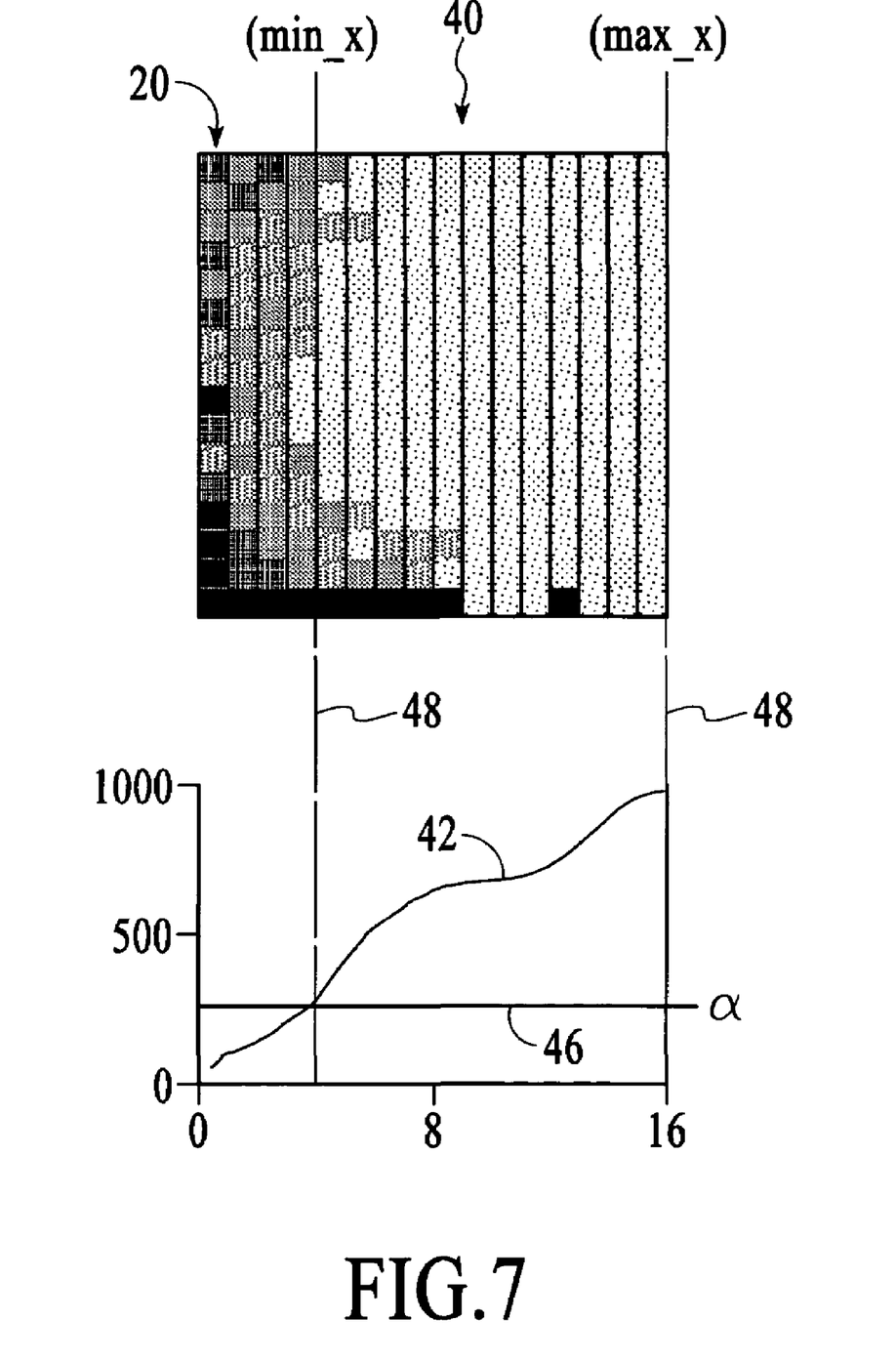
FIG. 7 depicts the image data and the graph of the per-column sums as described with reference to FIG. 5 relative to a column threshold and a navigation boundary in accordance with an embodiment of the invention.

FIG. 7 depicts the image data 40 and the graph of the per-column sums 42 as described with reference to FIG. 5 relative to a column threshold 46. FIG. 7 also includes the vertical navigation window boundaries 48 that are defined in response to the comparison of the per-column sums to the column threshold. With reference to the graph of FIG. 7, the column threshold is established at an intensity value identified as "α." Boundaries of the navigation window are established at the point, or points, where the per-column sums are equal to the column threshold. If the per-column sum is above the threshold at the edge of the image data, then the respective boundary is established at the edge of the image data. The vertical dashed lines 48 that project from the graph into the image data represent the x-axis boundaries of the navigation window. The image data that lies between the boundaries meets the minimum illumination requirements on a per-column basis.

Figure 8:
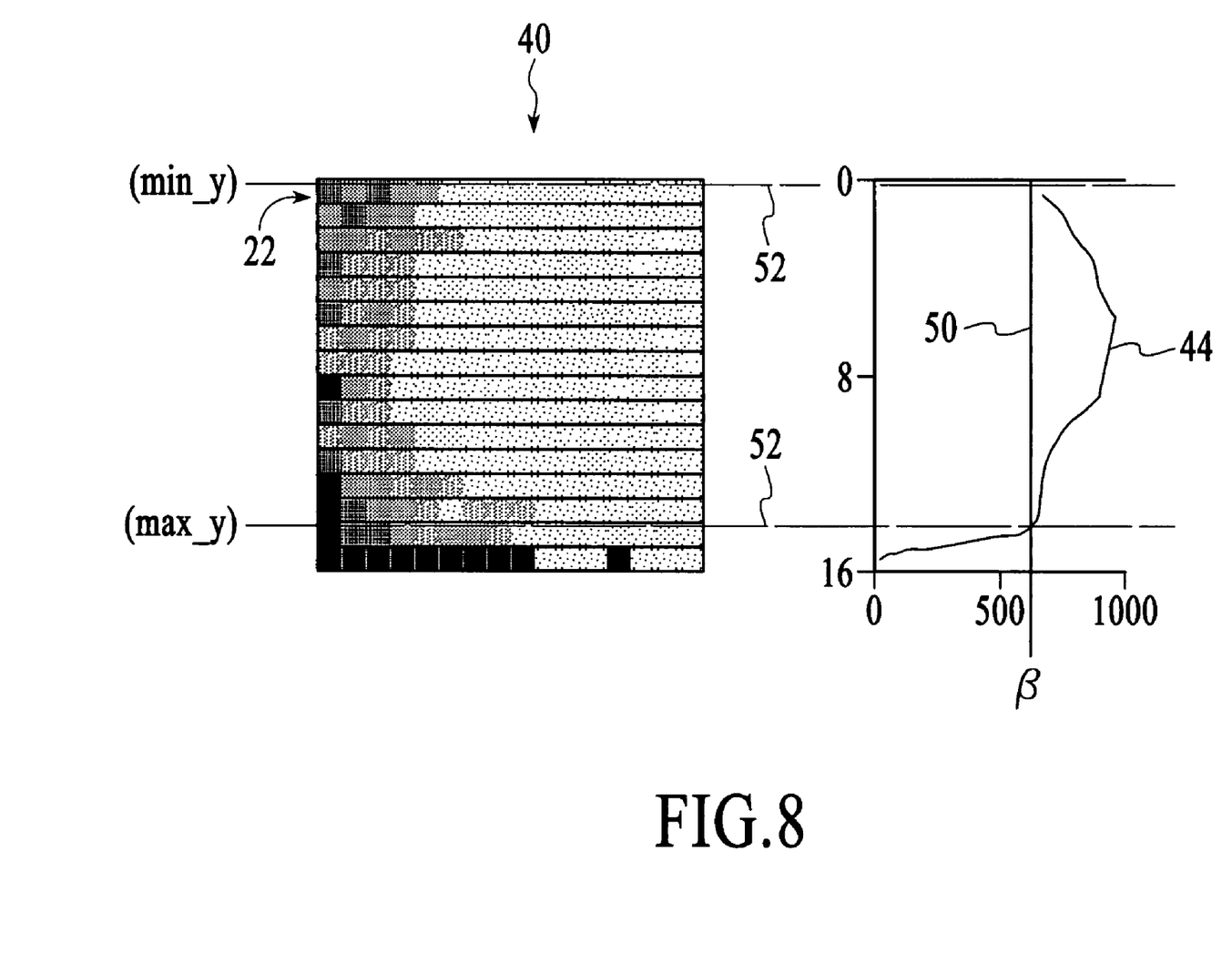
FIG. 8 depicts the image data and the graph of the per-row sums as described with reference to FIG. 6 relative to a row threshold and a navigation boundary in accordance with an embodiment of the invention.

FIG. 8 depicts the image data 40 and the graph of the per-row sums 44 as described with reference to FIG. 6 relative to a row threshold 50. FIG. 8 also includes the horizontal navigation window boundaries 52 that are defined in response to the comparison of the per-row sums to the row threshold. With reference to the graph of FIG. 8, the row threshold is established at an intensity value identified as "β." Boundaries of the navigation window are established at the point, or points, where the per-row sums are equal to the row threshold. If the per-row sum is above the threshold at the edge of the image data, then the respective boundary is established at the edge of the image data. The horizontal dashed lines 52 that project from the graph into the image data represent the y-axis boundaries of the navigation window. The image data that lies between the boundaries meets the minimum illumination requirements on a per-row basis.

Figure 9:
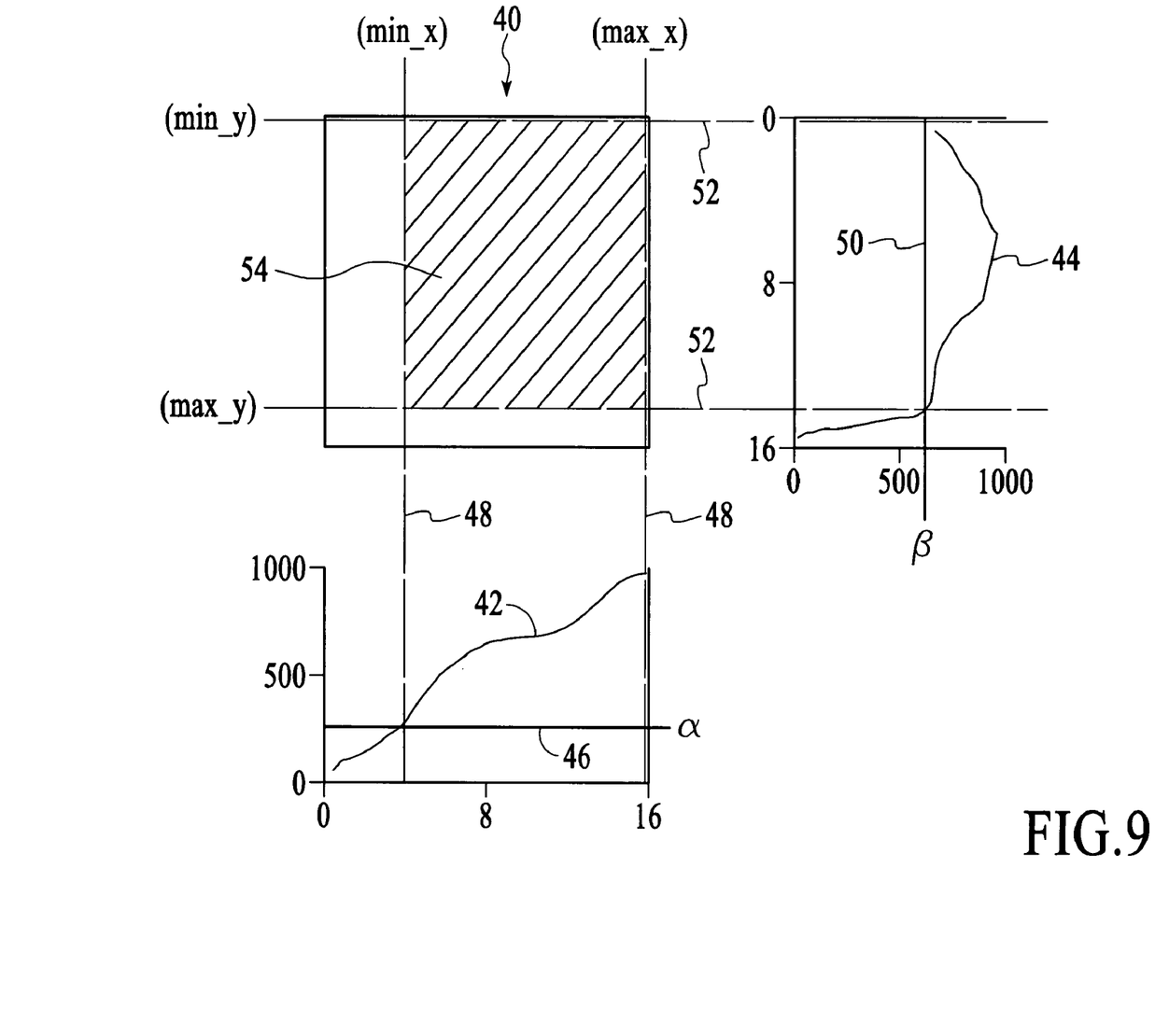
FIG. 9 depicts the navigation window that results when vertical and horizontal boundaries are established as described above with reference to FIGS. 7 and 8 in accordance with an embodiment of the invention.

FIG. 9 depicts the navigation window 54 that results when vertical and horizontal boundaries 48 and 52 are established as described above with reference to FIGS. 7 and 8. Referring to the image data, the vertical boundaries (min_x and max_x) and the horizontal boundaries (min_y and max_y) combine to define the navigation window. Only the image data that falls within the navigation window is used in the tracking process. In the example of FIG. 9, the image data has proper illumination at some of the edges of the image data. For example, the top edge and the right edge have intensity sums that are above the respective column and row thresholds and therefore no trimming is necessary.

Figure 10:
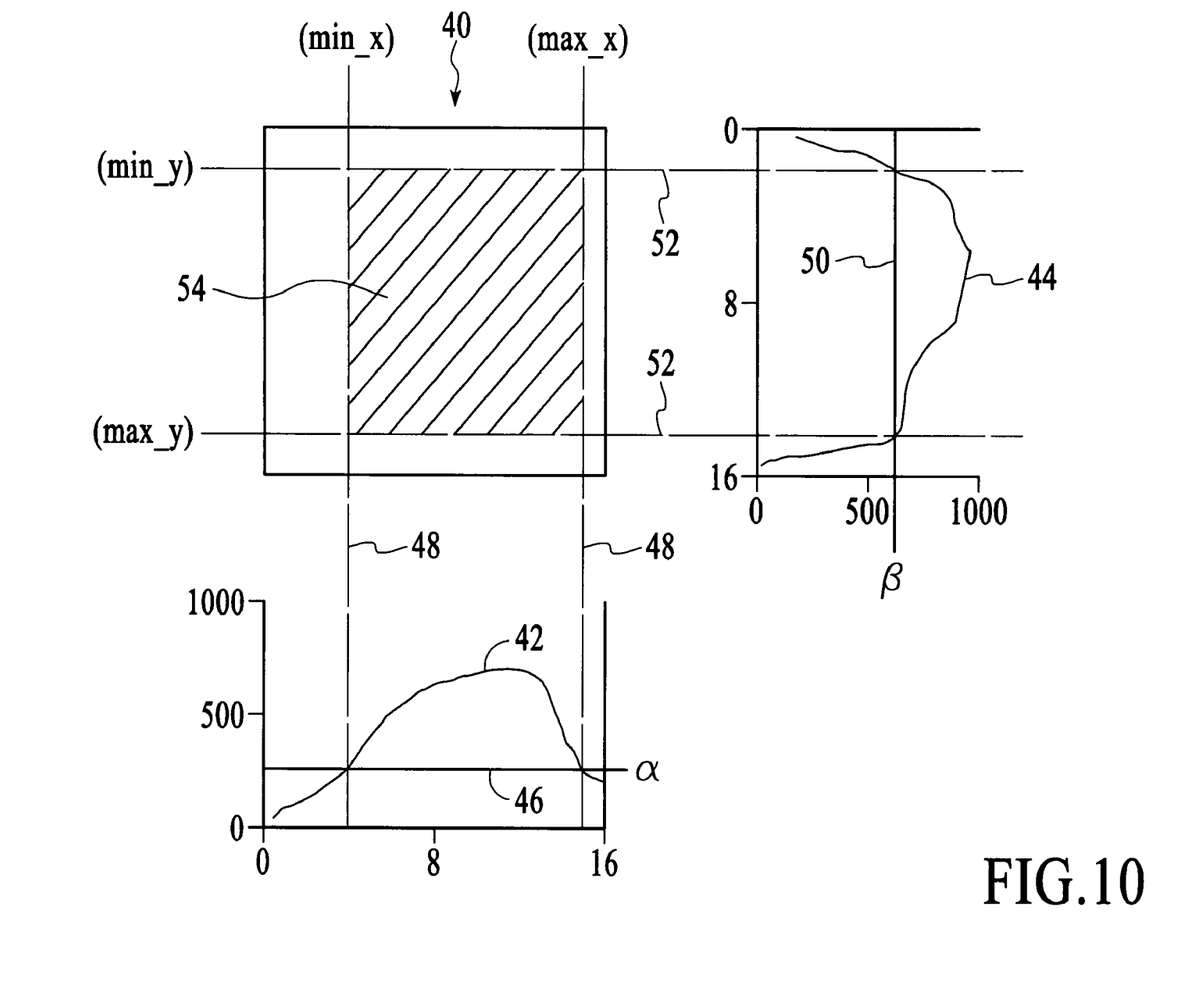
FIG. 10 depicts the navigation window in accordance with an embodiment of the invention that results when no edges of the image data are properly illuminated.

Although in the examples of FIGS. 7-9, the defined boundaries cause image data at two of the edges to be "trimmed" from the navigation window, it is possible that the image data is not adequately illuminated at any of the edges. FIG. 10 depicts the navigation window 54 that results when no edges of the image data are properly illuminated. Referring to FIG. 10, on a per-column basis, the portions of the image data on both the left and right sides are below the column threshold and therefore trimming of both the left and right edges of the image data is necessary. Likewise, on a per-row basis, the portions of the image data on the top and the bottom sides are below the row threshold and therefore trimming of both the top and bottom edges of the image data is required.

Figure 11:
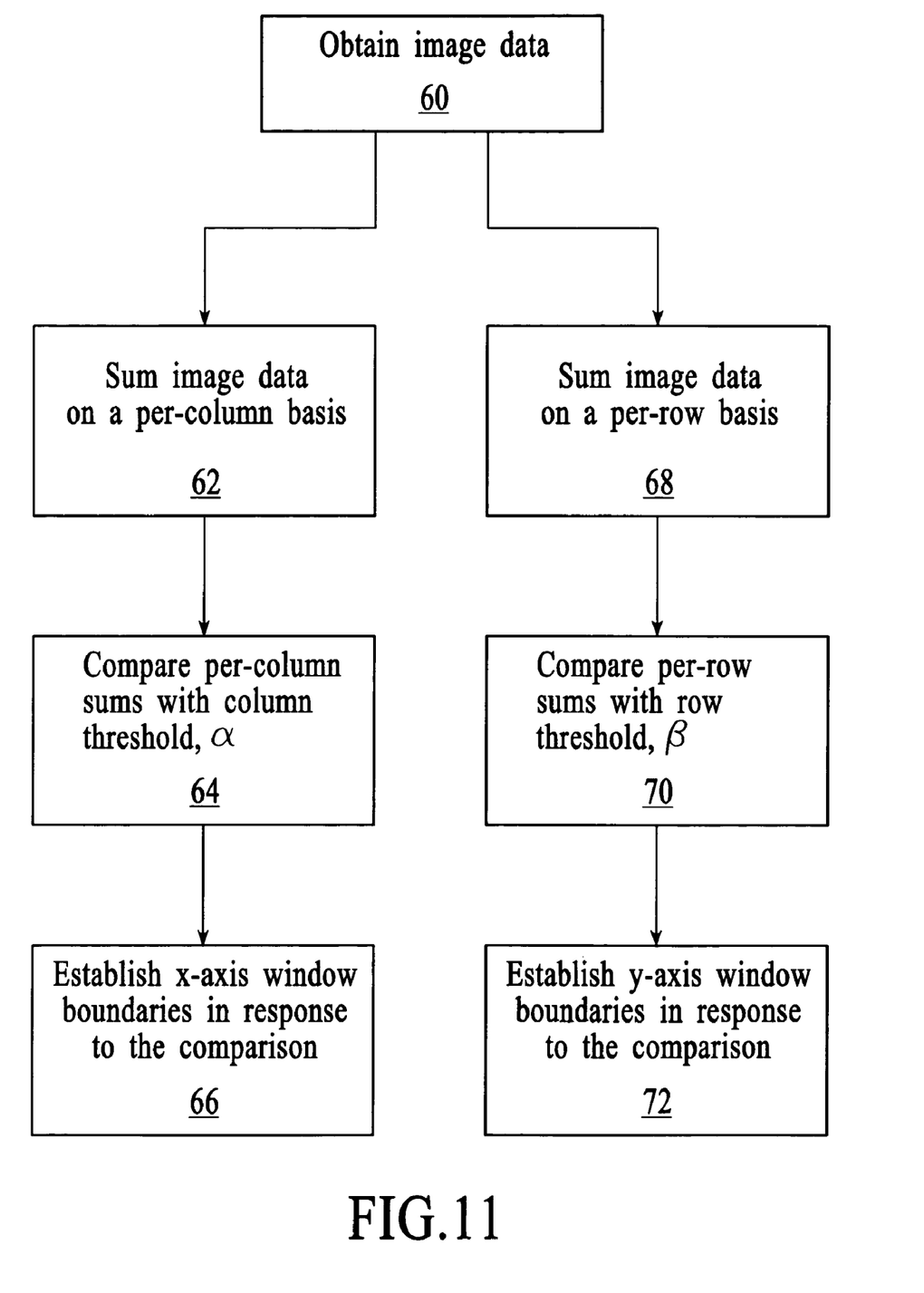
FIG. 11 depicts a process flow diagram of a method for optical navigation in accordance with an embodiment of the invention.

FIG. 11 depicts a process flow diagram of a method for optical navigation that corresponds to the above-described techniques. At step 60, image data is obtained. The processing involved in defining the x and y axis window boundaries can be performed in parallel processes and therefore the process flow diagram diverges into separate paths. With respect to the x-axis window boundaries (i.e., the boundaries that are parallel to the columns), at step 62, the image data is summed on a per-column basis. At step 64, the per-column sums are compared with the column threshold, α. At step 66, the x-axis window boundaries are established in response to the comparison. With respect to the y-axis window boundaries (i.e., the boundaries that are parallel to the rows), at step 68, the image data is summed on a per-row basis. At step 70, the per-row sums are compared with the row threshold, β. At step 72, the y-axis window boundaries are established in response to the comparison.

Figure 12:
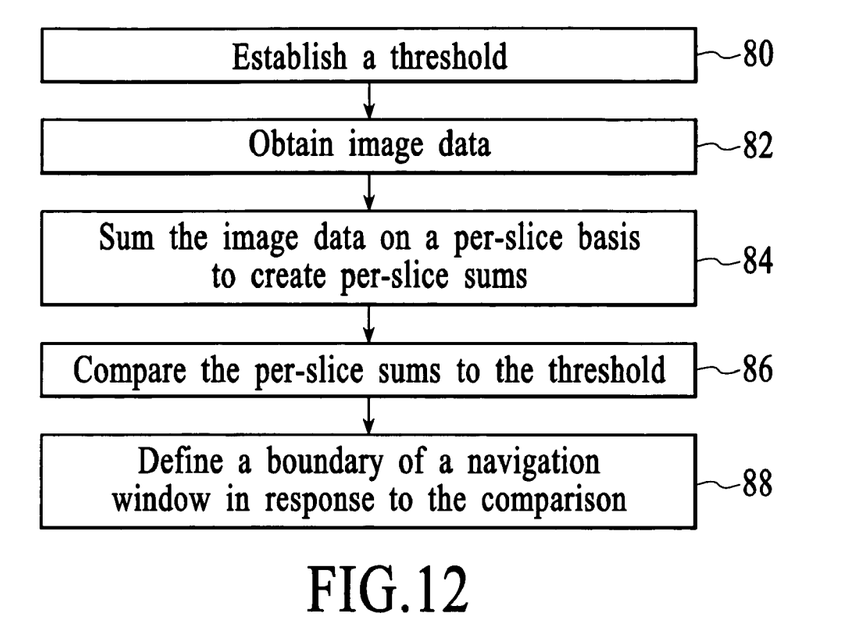
FIG. 12 depicts a process flow diagram of another method for optical navigation in accordance with an embodiment of the invention.

FIG. 12 depicts a process flow diagram of another method for optical navigation that corresponds to the above-described techniques. At step 80, a threshold is established. At step 82, image data is obtained. At step 84, the image data is summed on a per-slice basis to create per-slice sums. At step 86, the per-slice sums are compared to the threshold. At step 88, a boundary of a navigation window is defined in response to the comparison.

The above-described processes can be repeated on a continuous basis. For example, new image data is constantly acquired (e.g., at a rate of 1,500 images per second) and the window boundaries are dynamically adjusted in response to the newly acquired image data. By constantly updating the window boundaries in response to newly acquired image data, the system is responsive to changes in illumination conditions. In one alternative, the navigation window is established as part of a start-up process and modified at periodic intervals that are less often than the image capture rate.

Figure 3:
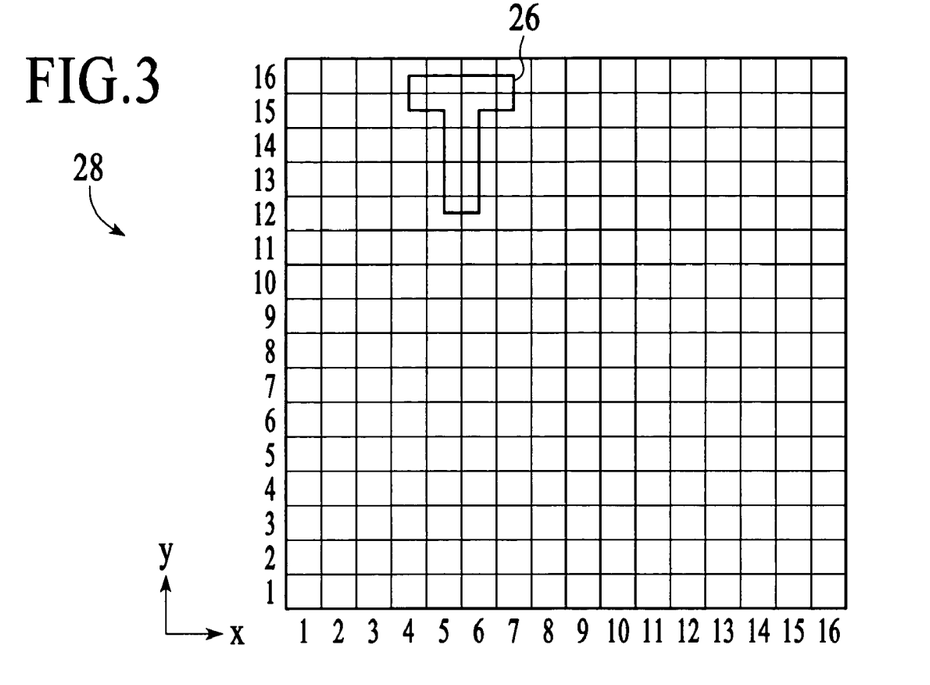
FIG. 3 depicts a set of sample image data that is obtained with the image sensor of FIG. 1 relative to the image sensor's photodetector array.

Because the image data that is used for tracking is obtained at close intervals (e.g., 1,500 images per second), the same window boundaries can be used for both the reference image data and the sample image data as depicted in FIGS. 2-4. Alternatively, the window boundaries can be determined for each set of image data.

Figure 13:
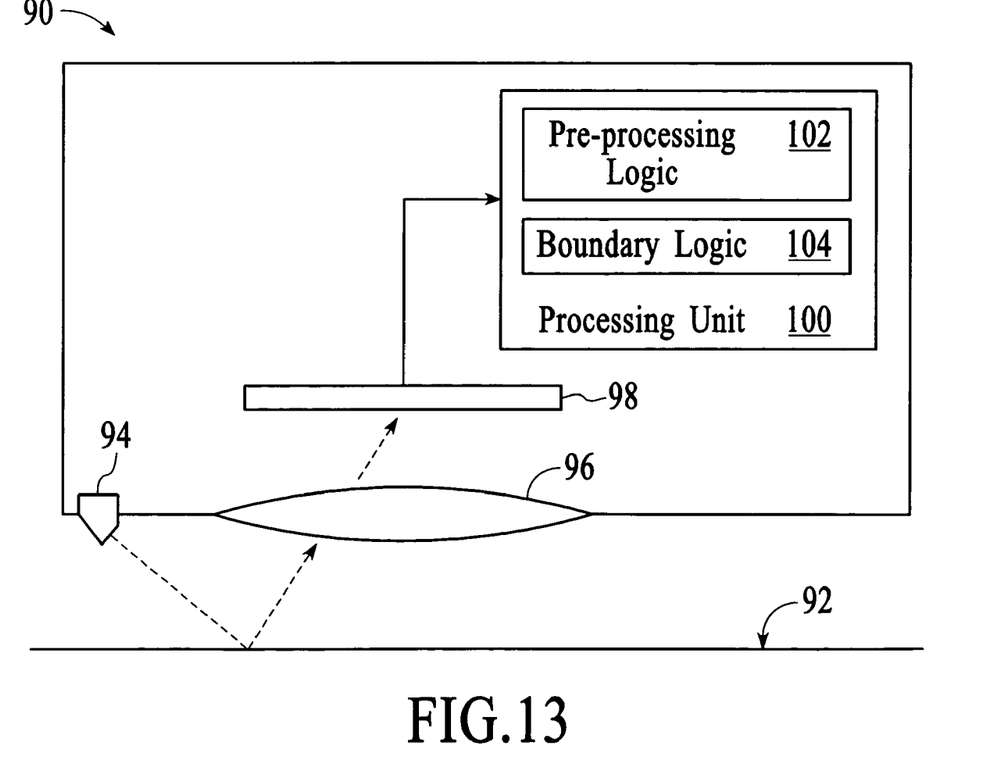
FIG. 13 depicts an example of an optical navigation system in accordance with an embodiment of the invention relative to a surface that is used for navigation.

FIG. 13 depicts an example of an optical navigation system 90 relative to a surface 92 that is used for navigation. The optical navigation system includes a light source 94, optics 96, an image sensor 98, and a processing unit 100. The light source (e.g., a light emitting diode) emits light, which illuminates the surface and is reflected towards the optical navigation system. The reflected light is collected by the optics and directed towards the image sensor. The image sensor detects the received light and outputs image data to the processing unit. For example, the image sensor captures reference image data and at some later time, sample image data. The processing unit processes the image data as described above to determine the boundaries of the navigation window and to determine the relative displacement between image data sets. The processing unit includes pre-processing logic 102 and boundary logic 104. The pre-processing logic performs the summing operations as described above and the boundary logic defines the boundaries of the navigation window as described above. The functional elements of the processing unit may be implemented in hardware, software, firmware, or any combination thereof. In an embodiment, the pre-processing logic is implemented in hardware while the boundary logic is implemented in firmware.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation method comprising: a processor to implement the step of:
    establishing an illumination threshold, wherein the illumination threshold is defined in terms of a minimum intensity value sum for an entire slice of image data;
    obtaining sets of image data, wherein the step of obtaining sets of image data comprises illuminating a navigation surface and detecting light that is reflected from the navigation surface;
    summing the obtained sets of image data on a per-slice basis to create per-slice sums;
    comparing the per-slice sums to the illumination threshold;
    defining a boundary of a navigation window in response to the comparison,
    wherein the illumination threshold is related to a minimum illumination that is acceptable within the navigation window to determine relative displacement between the obtained sets of image data; and
    determining relative displacement between the obtained sets of image data using only portion of the obtained sets of image data that falls within the navigation window.

2. The optical navigation method of claim 1 wherein the defining of the boundary includes setting the boundary in response to a per-slice sum that is less than the illumination threshold.

3. The optical navigation method of claim 1 wherein the summing of the image data on a per-slice basis comprises summing the image data on a per-column basis and on a per-row basis.

4. The optical navigation method of claim 3 wherein the establishing of the illumination threshold comprises establishing a column illumination threshold and a row illumination threshold and wherein the comparing of the per-slice sums to the illumination threshold comprises comparing the per-column sums to the per-column illumination threshold and comparing the per-row sums to the per-row illumination threshold.

5. The optical navigation method of claim 4 wherein the defining of the boundary comprises:
    defining a first boundary in response to the comparison of the per-column sums to the column illumination threshold; and
    defining a second boundary in response to the comparison of the per-row sums to the row illumination threshold.

6. The optical navigation method of claim 5 wherein:
    the first boundary is parallel to the columns over which the per-column sums are obtained; and
    the second boundary is parallel to the rows over which the per-row sums are obtained.

7. The optical navigation method of claim 4 wherein the column and row illumination thresholds are related to a minimum illumination that is acceptable within a navigation window.

8. The optical navigation method of claim 1 wherein summing the image data on a per-slice basis comprises adding intensity values from image sensor photodetectors in the same column or the same row.

9. The optical navigation method of claim 1 wherein the image data is an array of digital intensity values.

10. The optical navigation method of claim 1 further comprising dynamically adjusting the boundary of the navigation window in response to newly acquired image data.

11. An optical navigation method comprising: a processor to implement the steps of:
    obtaining sets of image data, wherein the step of obtaining sets of image data comprises illuminating a navigation surface and detecting light that is reflected from the navigation surface;
    summing the obtained sets of image data on a per-column basis and on a per-row basis; and
    defining boundaries of a navigation window in response to the summing, wherein defining the boundaries of the navigation window comprises:
    establishing a column illumination threshold and a row illumination threshold, wherein the column illumination threshold is defined in terms of a minimum intensity value sum for an entire column of image data and wherein the row illumination threshold is defined in terms of a minimum intensity value sum for an entire row of image data and wherein the column and row illumination thresholds are related to a minimum illumination that is acceptable within the navigation window to determine relative displacement between the obtained sets of image data;
    comparing the per-column sums to the column illumination threshold;
    establishing a first boundary of the navigation window in response to the comparison of the per-column sums to the column illumination threshold;
    comparing the per-row sums to the row illumination threshold; and establishing a second boundary of the navigation window in response to the comparison of the per-row sums to the row illumination threshold; and
    determining relative displacement between the obtained sets of image data using only portions of the obtained sets of image data that falls within the navigation window.

12. The optical navigation method of claim 11 wherein:
    establishing the first boundary further comprises establishing the boundary in response to a per-column sum that is less than the column illumination threshold; and
    establishing the second boundary further comprises establishing the boundary in response to a per-row sum that is less than the row illumination threshold.

13. The optical navigation method of claim 11 wherein:
    the first boundary is parallel to the columns over which the per-column sums are obtained; and
    the second boundary is parallel to the rows over which the per-row sums are obtained.

14. The optical navigation method of claim 11 wherein summing the image data on a per-column basis comprises adding intensity values from image sensor photodetectors in the same column and wherein summing the image data on a per-row basis comprises adding intensity values from image sensor photodetectors in the same row.

15. The optical navigation method of claim 11 wherein the boundaries are dynamic boundaries that are changed in response to new image data.

16. The optical navigation method of claim 11 wherein defining the boundaries comprises:

establishing a first pair of parallel boundaries of the navigation window in response to the comparison of the per-column sums to the column illumination threshold, wherein the first pair of parallel boundaries is parallel to the columns over which the per-column sums are established; and establishing a second pair of parallel boundaries of the navigation window in response to the comparison of the per-row sums to the row illumination threshold, wherein the second pair of parallel boundaries is parallel to the rows over which the per-row sums are established.

17. A system for processing image data for optical navigation comprising:

a light source configured to illuminate a navigation surface;

an image sensor configured to obtain sets of image data in response to light that is reflected from the navigation surface;

pre-processing logic configured to sum intensity values of the obtained sets of first-image data on a per-column basis and on a per-row basis; and boundary logic configured to define boundaries of a navigation window in response to the per-column and per-row sums, wherein the boundary logic is further configured to:

establish a column illumination threshold and a row illumination threshold, wherein the column illumination threshold is defined in terms of a minimum intensity value sum for an entire column of image data and wherein the row illumination threshold is defined in terms of a minimum intensity value sum for an entire row of image data and wherein the column and row illumination thresholds are related to a minimum illumination that is acceptable within the navigation window to determine relative displacement between the obtained sets of image data;

compare the per-column sums to the column illumination threshold;

establish a first boundary of the navigation window in response to the comparison of the per-column sums to the column illumination threshold;

compare the per-row sums to the row illumination threshold; and establish a second boundary of the navigation window in response to the comparison of the per-row sums to the row illumination threshold; and a processing unit configured to determine relative displacement between the obtained sets of image data using only portions of the obtained sets of image data that falls within the navigation window.

18. The optical navigation system of claim 17 wherein the boundary logic is further configured to:

establish the boundary in response to a per-column sum that is less than the column illumination threshold; and establish the boundary in response to a per-row sum that is less than the row illumination threshold.

19. The optical navigation system of claim 17 wherein:

the first boundary is parallel to the columns over which the per-column sums are obtained; and the second boundary is parallel to the rows over which the per-row sums are obtained.

* * * * *